(12) United States Patent
Thommana et al.

(10) Patent No.: US 7,599,515 B2
(45) Date of Patent: Oct. 6, 2009

(54) WIRELESS COMMUNICATION METHOD AND APPARATUS FOR GENERATING, WATERMARKING AND SECURELY TRANSMITTING CONTENT

(75) Inventors: John Thommana, Austin, TX (US); Debashish Purkayastha, Pottstown, PA (US); Alain Charles Louis Briancon, Poolesville, MD (US)

(73) Assignee: InterDigital Technology Corporation, Wilmington, DC (US)

( * ) Notice: Subject to any disclaimer, the term of this patent is extended or adjusted under 35 U.S.C. 154(b) by 687 days.

(21) Appl. No.: 11/082,451

(22) Filed: Mar. 17, 2005

(65) Prior Publication Data

US 2006/0212705 A1 Sep. 21, 2006

(51) Int. Cl.
*G06K 9/00* (2006.01)
*H04K 1/00* (2006.01)
*H04L 9/32* (2006.01)

(52) U.S. Cl. .................. 382/100; 380/270; 713/176
(58) Field of Classification Search ................. 382/100; 380/268, 269, 270; 713/176
See application file for complete search history.

(56) References Cited

U.S. PATENT DOCUMENTS

| | | | | |
|---|---|---|---|---|
| 5,889,868 A * | 3/1999 | Moskowitz et al. ......... 713/176 |
| 6,298,142 B1 * | 10/2001 | Nakano et al. ............. 382/100 |
| 6,674,861 B1 * | 1/2004 | Xu et al. ..................... 380/252 |
| 6,674,876 B1 * | 1/2004 | Hannigan et al. ........... 382/100 |
| 6,678,389 B1 * | 1/2004 | Sun et al. .................... 382/100 |
| 6,760,463 B2 * | 7/2004 | Rhoads ....................... 382/100 |
| 7,522,728 B1 * | 4/2009 | Rhoads ....................... 380/270 |
| 2001/0021926 A1 * | 9/2001 | Schneck et al. ............... 705/54 |
| 2003/0081809 A1 * | 5/2003 | Fridrich et al. ............. 382/100 |
| 2003/0147369 A1 * | 8/2003 | Singh et al. ................. 370/338 |
| 2003/0179901 A1 * | 9/2003 | Tian et al. ................... 382/100 |
| 2004/0021549 A1 * | 2/2004 | Choi et al. ................... 340/5.8 |
| 2005/0018843 A1 * | 1/2005 | Park .......................... 380/203 |
| 2005/0028192 A1 * | 2/2005 | Hooper et al. ................ 725/31 |
| 2005/0038813 A1 * | 2/2005 | Apparao et al. .......... 707/104.1 |
| 2006/0031297 A1 * | 2/2006 | Zuidema ..................... 709/206 |
| 2006/0050880 A1 * | 3/2006 | Taylor et al. ................ 380/203 |
| 2006/0053292 A1 * | 3/2006 | Langelaar ................... 713/176 |
| 2006/0107056 A1 * | 5/2006 | Bhatt et al. ................. 713/176 |

* cited by examiner

*Primary Examiner*—Brian P Werner
*Assistant Examiner*—Anthony MacKowey
(74) *Attorney, Agent, or Firm*—Volpe and Koenig, P.C.

(57) ABSTRACT

A method and apparatus for securing transmission of content created by a content generation device embedded in a wireless transmit/receive unit (WTRU) by determining what type of watermarks should be applied to the content and incorporating the watermarks in the content. The WTRU includes a content generation unit, a watermark incorporation unit, and a communication subsystem. The content generation unit is embedded in the WTRU and generates content, such as audio, video, image, text or a combination thereof. The watermark incorporation unit determines the type of watermarks that should be incorporated in the content and incorporates the watermarks in the content. The communication subsystem transmits the watermarked content.

37 Claims, 1 Drawing Sheet

US 7,599,515 B2

WIRELESS COMMUNICATION METHOD AND APPARATUS FOR GENERATING, WATERMARKING AND SECURELY TRANSMITTING CONTENT

FIELD OF INVENTION

The present invention is related to a wireless communication method and apparatus for securing data transmissions. More particularly, the present invention is a method and apparatus for securing transmission of content created by a content generation device embedded in a wireless transmit/receive unit (WTRU) by incorporating a watermark in the content.

BACKGROUND

Mobile phones, such as cellular phones operating in a global system for mobile communication (GSM) or universal mobile telephone service (UMTS) network, are no longer used just for voice communication. The mobile phones include embedded devices which are used to provide other features, such as a camera, a speech recorder, or the like. The incorporation of content generation devices into mobile phones permits users of the mobile phones to create and transmit audio, video, text or multimedia content via a wireless interface. Currently, there is no mechanism to safeguard the ownership, authenticity and safe distribution of the content created by these embedded devices.

The lack of such security mechanisms may result in misuse of the content, invasion of privacy or other problems. Therefore, there is a need for providing a security mechanism to safeguard the ownership, authenticity and safe distribution of the content developed by devices embedded in mobile phones.

SUMMARY

The present invention is a method and apparatus for securing transmission of content created by a content generation device embedded in a WTRU by determining the type of watermarks that should be applied to the content and incorporating the watermarks in the content. The present invention includes a watermarking mechanism in a WTRU such that users of the WTRU can incorporate a variety of watermarks in the content they create.

The WTRU includes a content generation unit, a watermark incorporation unit, and a communication subsystem. The embedded content generation unit generates content, such as audio, video, image, text, or a combination thereof. The watermark incorporation unit incorporates watermarks in the content. The watermarked content is transmitted by the communication subsystem. The transmission of the content is secured by the incorporated watermark.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, a personal data assistance (PDA), or any other type of device capable of operating in a wireless environment. When referred to hereafter, the terminology "base station" includes but is not limited to a Node-B, a site controller, an access point or any other type of interfacing device in a wireless environment.

The features of the present invention may be incorporated into an integrated circuit (IC) or be configured in a circuit comprising a multitude of interconnecting components.

Figure 1:
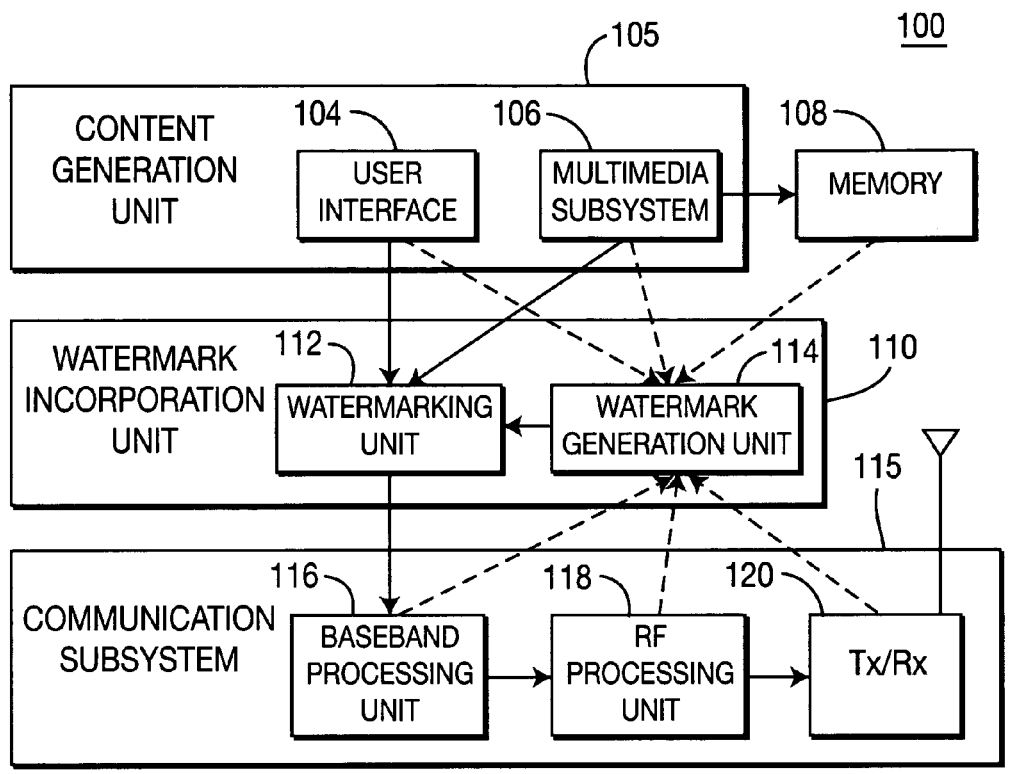
FIG. 1 is a block diagram of an apparatus for securing transmission of content generated by an embedded unit in a WTRU in accordance with the present invention.

FIG. 1 is a block diagram of a WTRU 100 configured to secure transmission of content generated by a content generation unit 105 embedded in the WTRU 100 in accordance with the present invention. The WTRU 100 further comprises a watermark incorporation unit 110, a communication subsystem 115, and a secure memory 108. The communication subsystem 115 includes a baseband processing unit 116, a radio frequency (RF) processing unit 118 and a transmitter/receiver, (i.e., transceiver) 120.

The content generation unit 105 is embedded in the WTRU 100 and generates content. The content generation unit 105 includes a user interface 104 and a multimedia subsystem 106. Content may be generated by users directly through the user interface 104, which is also used to input commands to the WTRU 100. The multimedia subsystem 106 generates content, which can be any type of content including, but not limited to, audio, video, image, text, or a combination thereof, and stores the content in the secure memory 108. For example, the content generation unit 105 may be a still camera, a video camera, a voice recorder embedded in a mobile phone, or any other device that can be embedded in the WTRU 100 and generates information transferable by the WTRU 100.

The watermark incorporation unit 110 includes a watermarking unit 112 and a watermark generation unit 114. The watermark generation unit 114 determines at least one watermark and algorithm for incorporating the watermark in the content. The determination is performed based on inputs from users via the user interface 104, hardware signatures, RF environment, channel conditions, type of session and protocol information. The watermark may be based on any single input or multiple inputs. Some characteristics may be directly used as a watermark, such as location information, signal strength measured at the WTRU 100 or the device identification obtained from the protocol information elements. Otherwise, analysis is performed by the watermark generation unit 114, based on the received inputs and optionally the user may be provided with a choice. The analysis takes into consideration certain elements such as RF environment, threat level, sensitivity of the context, or the like. The watermarking unit 112 incorporates the watermark into the content using the algorithm supplied by the watermark generation unit 114. The watermark generation unit 114 receives inputs from the user interface 104, the communication subsystem 115, the hardware profile and signatures stored in the memory 108. The watermarked content is forwarded by the watermarking unit 112 to the communication subsystem 115 for transmission.

Ongoing transmissions will be continuously monitored and analysis will be performed on the received signals' RF environment to determine if there is any need to change the watermark and watermarking algorithm. The watermark and watermarking algorithm may be determined based on signal strength as measured at the WTRU 100, received multipath signals, interference and fading patterns. If such a need arises, the watermark generation unit may generate a new set of watermarks to be embedded into the content.

The watermark incorporation unit 110 incorporates at least one watermark in the content. Watermarking is a process of adding a secure signature to the content to prevent unauthorized use of the content and/or authenticate the content. Currently, many algorithms have been developed to incorporate a watermark into text, image, audio and video content. The present invention utilizes any prior art watermark generation mechanism which currently exists or will be developed in the future.

The communication subsystem 115 transmits the watermarked content. Whenever the content exits the WTRU 100 to be transmitted by the communication subsystem 115 or to be stored or manipulated, the watermark. incorporation unit 110 is triggered to incorporate watermarks in the content.

Watermarks can be of two types, conceivable watermarks and inconceivable watermarks. The conceivability is not limited to visibility by human eyes, but may be any type that can be recognized by human senses, such as sound, smell, or the like. Besides symbols, logo, holograms which are visible to human eye, sounds like a bell or music can be used as a watermark. There are no limitations in what can be used as a watermark. The proper watermark is chosen depending on the sensor input such as device profile, content type, session information, RF environment, or the like.

In addition to incorporating watermarks in the content, (or alternatively), a header may be appended to the content. The header contains information about the WTRU 100, an owner or current user of the WTRU 100, or date and time of generation and/or transmission of the content, usage criteria and any other information that are necessary to tie the content to the WTRU 100 or the creator of the content. The header may contain information about the watermark and key information to decrypt it. The header acts as a metadata, conveying information about how to handle the content. Using a header reduces the need for message exchanges between the sender and receiver. The header may be appended after a watermark is incorporated in the content or may be separately appended regardless of incorporation of watermarks.

In order to incorporate watermarks in the content, several options are provided to the user via, for example, through the graphical user interface 104, whereby the user may choose the level or scheme of watermarks. Depending on the sensor inputs such as session type or transmission/operating environment, the user may be prompted about suitable watermarking schemes available and may be used under the current situation. The user chooses the right scheme by providing his inputs through the user interface 104, such as keyboard or other input devices, (e.g., touch screen, graphical user interface, stylus, voice activated response unit, etc.).

A first option is directed to whether or not to incorporate a watermark. This option can be used when the user is developing content that is deemed usable by anybody and in any context. When content created by embedded devices is transmitted, a user is prompted as to the watermarking. The user may be prompted via the user interface 104. If the user decides that the content does not need to be watermarked, the content is transmitted without watermarking. Alternatively, it may be automated such that a certain category of content may be transmitted without watermarks without prompting the user. The watermark generation unit 114 may be programmed to do such selective watermarking.

A second option is provided in terms of conceivability of the watermarks. The incorporated watermarks may be conceivable by human senses without decryption keys. Depending on inputs from the sensors and the user, the watermark generation unit 114 may decide to use conceivable watermark such as a logo. The watermark generation unit 114 directs the watermarking unit 112 to imprint the logo directly on the content. This type of watermarking is used to protect ownership of the content and may contain conceivable audio/visual information superimposed on the content. The watermark is conceivable by human senses without decryption keys, such as a visible logo or a jingle. The conceivable watermark is used as a means for auditing the authenticity of the image and rights of ownership.

The incorporated watermarks may be inconceivable by human senses without decryption keys. This type of watermarking is used to protect ownership and authenticity in content to prevent misuse or intentional modification of the content. The watermark is not conceivable to the human senses but can be detected using decryption keys. In accordance with the present invention, the type of watermark and the algorithm to be used is determined at the time of generation and transmission, taking into account the context of the communication. To determine the proper type of watermark, the present invention uses some of the very unique characteristics of the operating environment such as a channel characteristic, a device characteristic, and perceived threats at the time of transmission. Considering these unique criteria makes the watermark unique and difficult to duplicate and decrypt by others.

For example, by means of RF sensing over a very wide band, it may be possible to estimate or detect if any rouge WTRU is available in the vicinity which may be capable of tuning to the RF transmission of the legitimate WTRU. By doing this, the WTRU 100 may model the perceived threats around it and determine a watermarking strategy.

A third option is provided based on the content. More than one watermarking scheme or a different level of watermarking scheme may be chosen in accordance with importance of the content, nature of the content, a transfer mode, compression mode or any other criteria. The selection may be automatic or manual.

Different degrees of watermarks or a series of successive watermarks may be applied in accordance with the importance of the content. If the content is sensitive enough not to be altered or modified, then a higher level of watermarks or several successive watermarks may be incorporated. The user decides how sensitive the content is and instructs the watermark generation unit 114 through the user interface 104 such as a keypad, touch screen, or the like. The watermark generation unit 114 determines the degree, times, type, algorithm of watermarking, or the like, depending on the level of sensitivity, and alternatively depending on whether the sensitivity crosses certain threshold value, and instructs the watermarking unit 112.

Most content created by the WTRU 100 is subject to a variety of manipulations. The manipulations may be either intentional or unintentional. None of the currently available watermarks can survive all forms of manipulation. Therefore, there is a need of successive watermarking based on the importance of the content and the degree of manipulation that the content should survive. The watermark generation unit 114 decides to do successive watermarking and instructs the watermarking unit 112 to do so. The watermark generation unit 114 supplies the multiple watermarks to the watermarking unit 112.

The user of the WTRU 100 can create a series of content-based watermarks that can be applied to the content during its creation or post creation before distribution. For example, the WTRU 100 may be equipped with a 5 mega-pixel charge coupled device (CCD) for capturing an image, and recording of the image may be performed with high resolution. When the user is downloading the image over an interface, such as an USB or any serial or parallel interface, to a local computer, the user may use the high resolution version of the image. However, when the user sends the image with an email over the wireless interface, the user may perform compression of the image to reduce the size of the image, and the compression may be lossy with an acceptable loss of resolution. Instead of doing the watermarking at the time of content creation, the process is delayed until the content is being transmitted. The multimedia subsystem 106 and the user interface 104 create content and store the content in a temporary memory without any watermarking or compression. During transmission initiated by the user through the communication subsystem 115, the watermark generation unit 114 collects, as an input, the type of transport media that will be used in transmission of the content. Depending on the type and available bandwidth, the watermark generation unit 114 may compress the content and instruct the watermarking unit 112 to watermark with a proper watermark signal suitable for the content, which has been compressed from its original version.

Moreover, when the user is sending the image over the wireless interface, the image is also subject to manipulation depending on a transfer mode, (i.e., an acknowledged mode, an unacknowledged mode and a transparent mode). The acknowledged mode permits lossless transfer of the image over the air, but the other two modes are lossy mechanisms.

Therefore, depending on the compression scheme and wireless transfer mechanism, a series of successive watermarking has to be applied to survive the loss introduced by the compression and transfer. Every successive iteration serves to more extensively mix the original watermark. It acts as an interleaver and spreads the watermark thoroughly. Thus, the probability of losing any watermark information during lossy compression or transmission is reduced. This can be equated to some form of content equalization with an inverse transfer function so that the image is obtained undistorted at the other end. A similar means can be applied to recorded audio. For example, if the user records an audio at a 144 kbps (CD quality), the audio may be subject to 8-128 kbps compression using MP3 or other audio compression techniques so that it is suitable for transmission over the air. Therefore, the user has to select watermarking schemes that will survive the compression and transmission. There is also the potential that the recipient will subject the watermarked image to further compression.

The watermarking may be personal such that the content is embedded in the watermarks. In this case, only the watermarks are conceivable and the content is not conceivable by human senses without decryption keys for removing the watermarks. There are occasions when the owner wishes to create personal content that should never be put out for circulation and if it is accidentally circulated, the content should not be conceivable without the keys. This can be achieved in a special usage of watermark. The content may be hidden in the watermark. Therefore, only the watermark is conceivable and not the content. The user can define a series of trusted devices (by their serial numbers, or special watermarks in viewers and players) that equates to the input of the decryption key, thereby automatically eliminating the watermark. In this case the actual content is treated as a watermark signal and hidden under some plain text such as text file, general photograph, audio clip or a video clip. Thus, the watermark generation unit 114 provides the plain text, (or image, video, etc.), and instructs the watermarking unit 112 to embed the actual data in the plain text. The actual data may be encrypted using keys made up of identity of trusted devices. When the hidden content is received by those trusted devices, the plain text under which the actual data is hidden is automatically removed.

The personal watermarked content may also be subject to compression and manipulation during transmission over lossy channels. The covering watermark and content should be able to survive these manipulations and not lose the invisibility provided. Inadvertent recipients of the content may like the covering watermark and may decide to store it after subjecting it to various manipulations without knowing about the hidden content. The watermark should be able to survive these manipulations successively without revealing the hidden content.

The content is encrypted using keys which can be computed from device identity (ID), hardware ID. The encrypted data is hidden or embedded in a plain text, image or video. The hiding of data may be performed multiple times so that it can survive multiple manipulations.

Whenever the content exits the WTRU 100, (for example, over the air, through the Bluetooth protocol, infrared, through smart media, or equivalently when the content is stored or manipulated), a menu pops up that permits the user to modify the usage criteria stored in the header appended to the content or modify the watermarking level used during creation, as well as the type of rights that the user would like to assign to the content. The user can then modify it via user interfaces such as touch screen, keypad, or the like.

An automated list of successive watermarking options may be provided to the user to cover various contingencies. The watermark generation unit 114 prompts the user with the watermarking options it calculated from the inputs from communication subsystem 115, user inputs and device characteristics. The option list may be classified on the transport link to be used, destination machine, user, time of day, or the like.

A cellular network in which the WTRU 100 is operating, (i.e., a base station, a radio access network (RAN) or core network (CN)), may add supplementary information to the content. While the content is in transit, the network elements may add to the header of the content the ID and location information. This assists in determining the trail of the content.

Figure 2:
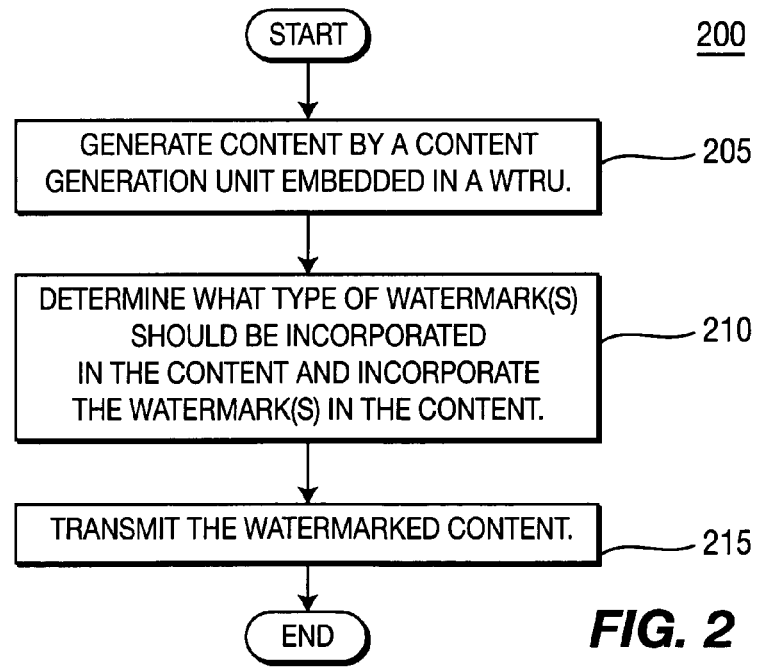
FIG. 2 is a flow diagram of a process for securing transmission of content generated by an embedded unit in a WTRU in accordance with the present invention.

FIG. 2 is a flow diagram of a process 200 including method steps for securing transmission of content generated by an embedded unit in a WTRU in accordance with the present invention. The content is generated by a content generation unit 105 embedded in a WTRU (step 205). Before the generated content is transmitted or outputted from the WTRU, the type of watermark(s) that should be incorporated in the content is determined and the determined watermark(s) is then incorporated in the content (step 210). The determination of watermark and watermarking algorithms is very dynamic whereby the determination is made just before transmission. The determination is made from inputs received from other subsystem such as channel characteristic, RF environment, perceived threat, device characteristic, session/transaction type, or the like. The watermark incorporated content is transmitted via an interface (step 215). The authenticity of the content is secured by the incorporated watermark.

Although the features and elements of the present invention are described in the preferred embodiments in particular combinations, each feature or element can be used alone without the other features and elements of the preferred embodiments or in various combinations with or without other features and elements of the present invention.

While the present invention has been described in terms of the preferred embodiment, other variations which are within the scope of the invention as outlined in the claims below will be apparent to those skilled in the art.

What is claimed is:

1. A method for secure transmission of content comprising:
   generating content using a content generation unit embedded in a wireless transmit/receive unit (WTRU)
   appending a header to the content;
   determining the type of watermark that should be incorporated into the content based on user input, hardware signature, radio frequency environment, type of wireless communication session and protocol, and perceived threat at the time of transmission of the content;
   incorporating the watermark in the content;
   transmitting the content, whereby the transmission of the content is secured by the incorporated watermark; and
   adding identity (ID) and location information to the header while the content is in transit to determine the trail of the content.

2. The method of claim 1 wherein the watermark is conceivable by human senses without a decryption key.

3. The method of claim 1 wherein the watermark is not conceivable by human senses without a decryption key.

4. The method of claim 1 wherein the header provides information correlating the content with either the WTRU or a person who created the content.

5. The method of claim 1 wherein the watermark is incorporated in the content such that the content is hidden in the watermark; whereby the watermark is conceivable but the content is not conceivable without a decryption key for removing the watermark.

6. The method of claim 5 wherein a particular device is trusted such that the incorporated watermark is automatically removed when the content is processed by the particular device.

7. The method of claim 1 wherein the watermark is selectively incorporated in accordance with the type of content.

8. The method of claim 1 wherein a series of a plurality of different watermarking schemes is applied to the content based on a compression mechanism which is applied to the content.

9. The method of claim 1 wherein a plurality of different watermarking schemes are applied to the content based on a wireless transfer mode which is applied for wireless transmission of the content.

10. The method of claim 1 wherein a different watermarking scheme is applied to the content based on the degree of importance of the content.

11. The method of claim 10 wherein a plurality of watermarking schemes are applied successively based on the degree of importance of the content.

12. The method of claim 10 wherein a menu for selecting the watermarking scheme is presented to a user of the WTRU before the content is watermarked.

13. The method of claim 1 wherein a user of the WTRU further assigns usage of the content and a right related to the content.

14. The method of claim 1 wherein the watermark is incorporated such that the watermark is not damaged by compression of the watermark incorporated content including lossless compression and lossy compression.

15. The method of claim 1 wherein the watermark is incorporated such that the watermark is not damaged by subsequent manipulation of the watermark incorporated content.

16. A wireless transmit/receive unit (WTRU) comprising:
   a content generation unit for generating content and appending a header to the content;
   a watermark incorporation unit for determining the type of watermark that should be applied to the content based on user input, hardware signature, radio frequency environment, type of wireless communication session and protocol, and perceived threat at the time of transmission of the content and for incorporating the watermark in the content; and
   a communication subsystem for transmitting the watermark incorporated content, whereby transmission of the content is secured by the incorporated watermark, and identity (ID) and location information are added to the header while the content is in transit to determine the trail of the content.

17. The WTRU of claim 16 wherein the watermark is conceivable by human senses without a decryption key.

18. The WTRU of claim 16 wherein the watermark is not conceivable by human senses without a decryption key.

19. The WTRU of claim 16 wherein the header provides information correlating the content with either the WTRU or a person who created the content.

20. The WTRU of claim 16 wherein the watermark is incorporated in the content such that the content is hidden in the watermark; whereby the watermark is conceivable but the content is not conceivable without a decryption key for removing the watermark.

21. The WTRU of claim 20 wherein a particular device is trusted such that the incorporated watermark is automatically removed when the content is processed by the particular device.

22. The WTRU of claim 16 wherein the watermark is selectively incorporated in accordance with the type of content.

23. The WTRU of claim 16 wherein a series of a plurality of different watermarking scheme is applied to the content based on a compression mechanism subsequently applied to the content.

24. The WTRU of claim 16 wherein a plurality of different watermarking schemes are applied to the content based on a wireless transfer mode applied for wireless transmission of the content.

25. The WTRU of claim 16 wherein a different watermarking sc6heme is applied to the content based on the degree of importance of the content.

26. The WTRU of claim 25 wherein a plurality of watermarking schemes are applied successfully based on the degree of importance of the content.

27. The WTRU of claim 25 wherein a menu for selecting the watermarking scheme is presented to a user of the WTRU before the content is watermarked.

28. The WTRU of claim 16 wherein a user of the WTRU further assigns usage of the content and a right related to the content.

29. The WTRU of claim 16 wherein the watermark is incorporated such that the watermark is not damaged by compression of the watermark incorporated content including lossless compression and lossy compression.

30. The WTRU of claim 16 wherein the watermark is incorporated such that the watermark is not damaged by subsequent manipulation of the watermark incorporated content.

31. The WTRU of claim 16 wherein the content generation unit comprises a user interface and a multimedia subsystem.

32. The WTRU of claim 16 wherein the watermark incorporation unit comprises a watermarking unit and a watermark generation unit.

33. The WTRU of claim 16 wherein the communication subsystem comprises a baseband processing unit, a radio frequency (RF) processing unit and a transceiver.

34. An integrated circuit (IC) comprising:
   a content generation unit for generating content and appending a header to the content;
   a watermark incorporation unit for determining the type of watermark that should be applied to the content based on user input, hardware signature, radio frequency environment, type of wireless communication session and protocol, and perceived threat at the time of transmission of the content and for incorporating the watermark in the content; and
   a communication subsystem for transmitting the watermark incorporated content, whereby transmission of the content is secured by the incorporated watermark, and identity (ID) and location information are added to the header while the content is in transit to determine the trail of the content.

35. The IC of claim 34 wherein the content generation unit comprises a user interface and a multimedia subsystem.

36. The IC of claim 34 wherein the watermark incorporation unit comprises a watermarking unit and a watermark generation unit.

37. The IC of claim 34 wherein the communication subsystem comprises a baseband processing unit, a radio frequency (RF) processing unit and a transceiver.

* * * * *

UNITED STATES PATENT AND TRADEMARK OFFICE
CERTIFICATE OF CORRECTION

PATENT NO. : 7,599,515 B2
APPLICATION NO. : 11/082451
DATED : October 6, 2009
INVENTOR(S) : Thommana et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 966 days.

Signed and Sealed this

Twenty-eighth Day of September, 2010

David J. Kappos
*Director of the United States Patent and Trademark Office*